US010988668B2

(12) United States Patent
Kadam et al.

(10) Patent No.: US 10,988,668 B2
(45) Date of Patent: *Apr. 27, 2021

(54) TREATMENT FLUIDS FOR REDUCING SUBTERRANEAN FORMATION DAMAGE

(71) Applicant: Halliburton Energy Services, Inc., Houston, TX (US)

(72) Inventors: Sunita Sameer Kadam, Pune (IN); Rajendra Arunkumar Kalgaonkar, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/828,168

(22) Filed: Nov. 30, 2017

(65) Prior Publication Data

US 2018/0086969 A1 Mar. 29, 2018

Related U.S. Application Data

(62) Division of application No. 14/438,923, filed as application No. PCT/US2014/046009 on Jul. 9, 2014, now Pat. No. 9,862,874.

(51) Int. Cl.
| C09K 8/528 | (2006.01) |
| C09K 8/72 | (2006.01) |
| E21B 21/00 | (2006.01) |
| E21B 37/00 | (2006.01) |

(52) U.S. Cl.
CPC ............ *C09K 8/528* (2013.01); *C09K 8/72* (2013.01); *E21B 21/003* (2013.01); *E21B 37/00* (2013.01)

(58) Field of Classification Search
None
See application file for complete search history.

(56) References Cited

U.S. PATENT DOCUMENTS

| 6,877,563 B2 | 4/2005 | Todd et al. |
| 7,906,464 B2 | 3/2011 | Davidson |
| 8,114,818 B2 | 2/2012 | Reddy et al. |

(Continued)

FOREIGN PATENT DOCUMENTS

| GB | 2519388 A | 4/2015 |
| WO | WO-2015/132570 A1 | 9/2015 |
| WO | WO-2016/007155 A1 | 1/2016 |

OTHER PUBLICATIONS

Caira et al. "Cyclodextrin Inclusion of p-Hydroxybenzoic Acid Esters" Journal of Thermal Analysis and Calorimetry, vol. 73(2003) 647-651.*

(Continued)

*Primary Examiner* — Charles R Nold
(74) *Attorney, Agent, or Firm* — Tenley Krueger; C. Tumey Law Group PLLC

(57) ABSTRACT

Methods of introducing a treatment fluid into a subterranean formation having a filtercake deposited thereon, wherein the treatment fluid comprises a base fluid and an inclusion complex comprising a cyclodextrin compound and an acid precursor ester, and wherein the cyclodextrin compound delays hydrolysis of the acid precursor ester; contacting the treatment fluid with the filtercake; and hydrolyzing the acid precursor ester, thereby removing at least a portion of the filtercake.

8 Claims, 2 Drawing Sheets

(56) References Cited

U.S. PATENT DOCUMENTS

| | | |
|---|---|---|
| 8,357,377 B2 | 1/2013 | Pun et al. |
| 8,541,051 B2 | 9/2013 | Saini et al. |
| 2004/0109888 A1 | 6/2004 | Pun et al. |
| 2008/0078549 A1 | 4/2008 | Moorehead et al. |
| 2009/0181866 A1 | 7/2009 | Reddy et al. |
| 2009/0286701 A1 | 11/2009 | Davidson |
| 2011/0127039 A1 | 6/2011 | Garcia-Lopez De Victoria et al. |
| 2011/0220358 A1 | 9/2011 | Robinson et al. |
| 2012/0111564 A1 | 5/2012 | Reddy et al. |
| 2012/0279711 A1 | 11/2012 | Collins et al. |
| 2013/0150272 A1 | 6/2013 | Sonne et al. |
| 2013/0153223 A1 | 6/2013 | Muthusamy et al. |
| 2014/0128295 A1 | 5/2014 | Wagles et al. |
| 2016/0304765 A1 | 10/2016 | Kadam et al. |
| 2016/0362597 A1* | 12/2016 | Harris .................... C09K 8/524 |

OTHER PUBLICATIONS

Trotta et al. "The Effect of Cyclodextrins on the Hydrolysis of Carboxylic Acid Esters" Journal of Inclusion Phenomena and Molecular Recogniction in Chemistry 20: 353-361, 1995.*

Chalia et al., "Cyclodextrins in Drug Delivery: An Updated Review," AAPS PharmSciTech, 2005, vol. 6, No. 2, Article No. 43, E329-E357.

Australian Office Action from Australian Patent Application No. 2014400599, dated Feb. 16, 2017.

International Search Report and Written Opinion from International Application No. PCT/US2014/046009, dated Mar. 24, 2015.

* cited by examiner

TREATMENT FLUIDS FOR REDUCING SUBTERRANEAN FORMATION DAMAGE

CROSS-REFERENCE TO RELATED APPLICATIONS

This application is a divisional of U.S. Patent Application 14/438,923, filed on Apr. 28, 2015, which claims the benefit of priority under 371(c) from PCT/US2014/46009, filed on Jul. 9, 2014, each of which is incorporated herein by reference in its entirety.

BACKGROUND

The present disclosure generally relates to treatment fluids for reducing subterranean formation damage, and, more specifically, to treatment fluids including an inclusion complex comprising a cyclodextrin compound and an acid precursor ester capable of delayed acid dissolution of formation damage.

Treatment fluids may be used in a variety of subterranean treatment operations. Such treatment operations may include, without limitation, drilling operations, completion operations, stimulation operations, production operations, remediation operations, sand control operations, and the like. As used herein, the term "treatment," and all of its grammatical variants (e.g., "treat," "treating," and the like), refers to any subterranean formation operation that employs a fluid in conjunction with achieving a desired function and/or for a desired purpose. Use of these terms does not imply any particular action by the treatment fluid or a component therein, unless otherwise specified herein. More specific examples of illustrative treatment operations may include, but are not limited to, hydraulic fracturing operations, gravel packing operations, acidizing operations, scale dissolution and removal operations, consolidation operations, and the like.

During treatment operations, the subterranean formation being treated may experience formation damage. As used herein, the terms "formation damage" or "damage," and all of their grammatical variants, refer to a reduction in the permeability of the formation in the near wellbore region, such as by deposition of a filtercake, natural or intentional, on the face of the formation. As used herein, the terms "formation damage" and "filtercake" may be used interchangeably. As used herein, the terms "particulate bridging material" or "bridging material," and all grammatical variants thereof, refer to any particulate material, whether naturally present in a subterranean formation or introduced into a subterranean formation, that causes formation damage (i.e., reducing the permeability of the formation).

Because formation damage may occur during various treatment operations, such damage may accordingly arise at various stages of the lifecycle of the formation. Formation damage during drilling may be caused by a number of mechanisms including, for example, saturating the formation in the near wellbore region with fluids (e.g., aqueous fluids) from drilling fluids due to fluid loss, altering the wettability of the formation to oil-wet due to interactions with drilling fluid additives such that the formation preferentially imbibes oil, blocking the pore throats of the formation with solids or other precipitated compounds (e.g., metal ions) from drilling fluids and/or the formation, and the like.

During production of a wellbore in a subterranean formation (e.g., hydrocarbon production), formation damage may be undesirable as the highest pressure drops during production occur at the damaged near wellbore region. The damage causes a positive skin factor, or increased flow resistance, in the near wellbore region, which may reduce the productivity index of the wellbore (i.e., the ability of a reservoir in the formation to deliver fluids to the wellbore). Such a reduction in the productivity index may translate directly into economic costs for a wellbore operator, in terms of reduced fluid recovery (e.g., hydrocarbons), costly remedial operations such as expensive well stimulations, increased operator work time associated with remedial operations, and the like.

Conventional breakers used to remove formation damage involve use of very corrosive acids that interact with the particulate bridging material. Such corrosive acids may pose significant environmental, health, and safety risks and require specialized equipment (e.g., tubing, transportation and storage tanks, transportation trucks, and the like). The corrosive acids may additionally result in uncontrolled and immediate reactions with the formation damage, resulting in localized removal of the damage rather than a desired large expanse of damage. That is, the corrosive acid immediately reacts and is spent in a localized interval prior to reaching other locations downhole for formation damage removal. Additionally, the corrosive acids may increase the risk of wormholing. As used herein, the term "wormholing" or "wormhole," and all grammatical variants thereof, refers to a large, empty channel that can penetrate several feet into a formation caused by non-uniform removal or dissolution of formation damage.

Esters have also been used as slow-release materials that hydrolyze to form acids capable of removing or dissolving formation damage over long intervals in a subterranean formation, due to their delayed acid release capability. The action of the esters may be delayed for several hours in normal circumstances. However, the presence of certain additives in the subterranean formation may hasten their action, such as breakers. Moreover, as the temperature of a downhole environment increases, such as in deeper and deeper wells which are becoming commonplace, the action of the ester is greater hastened, thereby defeating the beneficial slow-release of acid using the esters.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
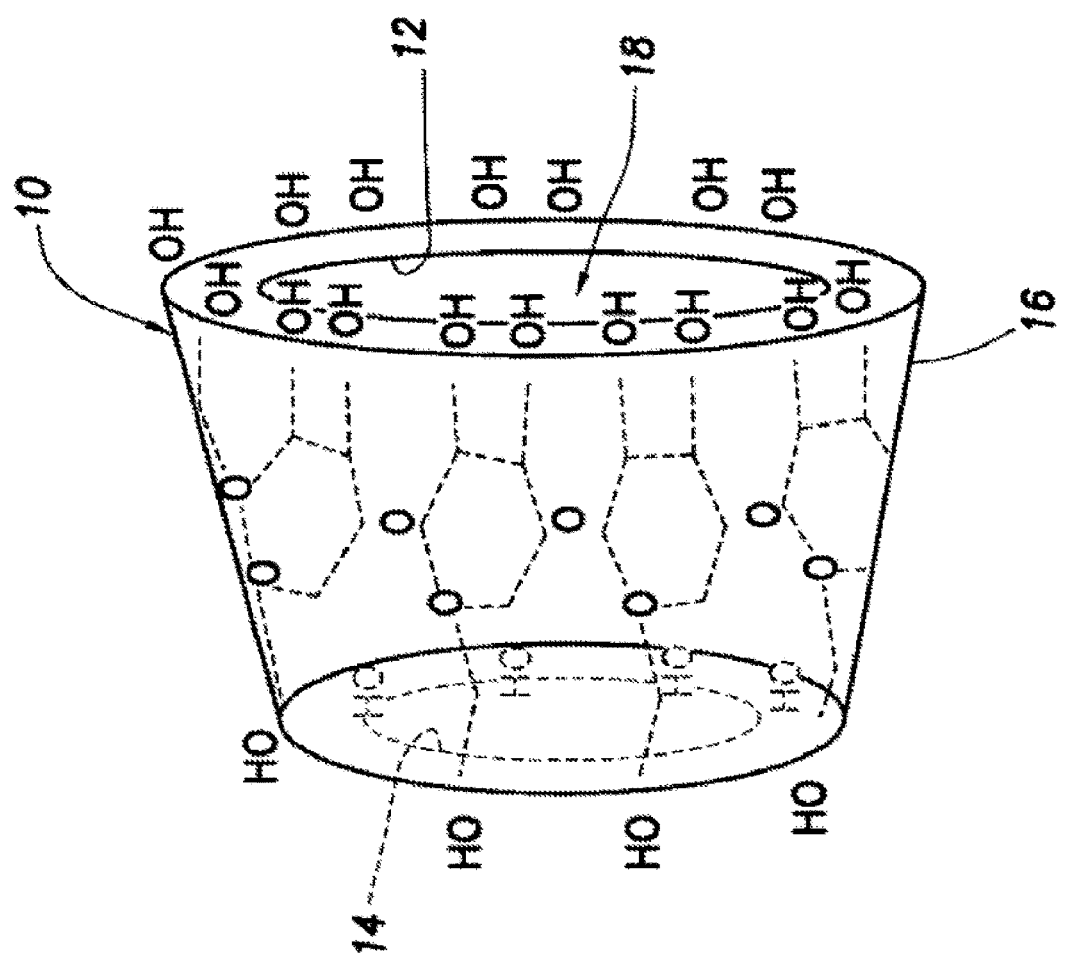
FIG. 1 illustrates the toroidal shape of a cyclodextrin compound.

The present disclosure generally relates to treatment fluids for reducing subterranean formation damage, and, more specifically, to treatment fluids including an inclusion complex comprising a cyclodextrin compound and an acid precursor ester capable of delayed acid dissolution of formation damage.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a treatment fluid comprising a base fluid and an inclusion complex. The inclusion complex comprises a cyclodextrin compound and an acid precursor ester. In some embodiments, the treatment fluid may be introduced into a subterranean formation having a filtercake (i.e., formation damage) deposited thereon. In some embodiments, the treatment fluid comprising the inclusion complex as a pill. As used herein, the term "pill" refers to a small volume of a treatment fluid used for a particular operation. The filtercake may be an oil-based filtercake, a water-based filtercake, or a combination thereof. The filter cake may be deposited, for example, on the face of the subterranean formation (e.g., on the wall of a wellbore) or the face of a fracture formed in the subterranean formation (e.g., by hydraulic fracturing, perforation, hydrajetting, or other technique). In some embodiments, the filtercake may be comprised of particulate bridging materials that are at least partially, substantially (i.e., largely but not wholly), or wholly made up of inorganic salts such as, for example, calcium carbonate, manganese (II,II) oxide, zinc oxide, magnesium carbonate, or any combination thereof, and may be naturally occurring or present as a result of a previous or concurrent treatment operation in the formation.

The acid precursor ester in the inclusion complex hydrolyzes to produce an acid that is capable of removing at least a portion of the filtercake, after contacting the treatment fluid with the filtercake. That is, the treatment fluid is contacted with the filtercake and thereafter the acid precursor ester in the inclusion complex is hydrolyzed to form an acid capable of removing at least a portion of the filtercake. The hydrolyzed acid precursor ester, in one embodiment, reacts with the inorganic salts of the particulate bridging material comprising the filtercake to remove the portion of the filtercake.

The inclusion complex is capable of delaying the hydrolysis of the acid precursor ester generally, and as compared to the acid precursor ester alone in a subterranean formation. Such delay permits the use of the inclusion complex in treatment fluids having components that would otherwise greatly enhance the hydrolysis rate of the acid precursor ester. Accordingly, removal of a filtercake may be achieved in the presence of such components while ensuring the delayed hydrolysis of the acid precursor ester to achieve controlled and delayed hydrolysis for long interval treatments. Additionally, the delay permits the use of the inclusion complexes in elevated temperature subterranean formations, where traditional filtercake breakers could not be used to remove long intervals of a filtercake or multiple filtercakes along said interval. Such subterranean formations may have temperatures in the range of a lower limit of about 25° C., 30° C., 35° C., 40° C., 45° C., 50° C., 55° C., 60° C., 65° C., 70° C., 75° C., and 80° C. to an upper limit of about 150° C., 145° C., 140° C., 135° C., 130° C., 125° C., 120° C., 115° C., 110° C., 105° C., 100° C., 95° C., 90° C., 85° C., and 80° C., encompassing any value and subset therebetween.

The inclusion complex of the disclosure herein comprises a cyclodextrin compound and an acid precursor ester. Generally, a cyclodextrin compound is thought to be a cyclic oligosaccharide comprising at least 6 glucopyranose units joined by α-(1,4) glycoside linkages. In some instances, a cyclodextrin compound suitable for use in the embodiments described herein may have up to about 150 or more glucopyranose units joined by α-(1,4) glycoside linkages. The cyclodextrin compounds for use in forming the inclusion complexes described herein may include, but are not limited to, a cyclodextrin, a cyclodextrin compound, and any combination thereof.

Suitable cyclodextrins compounds include α-cyclodextrin (having 6 glucopyranose units joined by α-(1,4) glycoside linkages), β-cyclodextrin (having 7 glucopyranose units joined by α-(1,4) glycoside linkages), γ-cyclodextrin (having 8 glucopyranose units joined by α-(1,4) glycoside linkages), and any combination thereof. Such cyclodextrins may be represented as toroids. Referring to FIG. 1, γ-cyclodextrin is represented as a toroid 10 with larger opening 12 and smaller opening 14 of the toroid 10 representing secondary and primary hydroxyl groups, respectively. In general, the exterior 16 of the toroid 10 should be sufficiently hydrophilic for the cyclodextrin to possess some water solubility. Internal cavity 18 of toroid 10 is generally apolar or relatively more hydrophobic and less hydrophilic than the exterior 16 of the toroid 10 and, thus, should be attractive to hydrophobic or lipophilic molecules. For example, the internal cavity 18 may be capable of hosting a hydrophobic portion of a "guest" compound, such as the acid precursor esters described herein. As used herein, the term "inclusion complex" refers to the complex formed with a cyclodextrin compound functioning as a "host" to a "guest" compound that is contained or bound, partially, substantially, or wholly, within the internal cavity of the cyclodextrin compound. The containment or entrapment of the acid precursor esters described herein is believed to temporarily block or delay the mechanism by which the acid precursor ester hydrolyzes to produce an acid capable of removing a portion of a filter cake.

Cyclodextrin compounds may also be derivatives of α-cyclodextrin, a β-cyclodextrin, a γ-cyclodextrin for use in forming the inclusion complexes described herein. These cyclodextrin derivatives may be prepared by introducing different functional groups an α-cyclodextrin, a β-cyclodextrin, and/or a γ-cyclodextrin molecule by reaction with the primary hydroxyl groups and/or the secondary hydroxyl groups. Because the hydroxyl groups have different reactivity, derivatizing the cyclodextrin may result in an amorphous mixture that includes numerous isomers of different cyclodextrin derivatives. Such derivatives may be further be derivative using oligomer or polymer functional groups.

Examples of suitable cyclodextrin derivatives for use as a cyclodextrin compound described herein include, but are not limited to, acylated cyclodextrin containing acetyl, propionyl, butyryl, or other suitable acyl groups; hydroxylated cyclodextrin containing hydroxyethyl, hydroxypropyl, or other suitable hydroxy-alkyl groups; carboxylated cyclodextrin containing carboxymethyl, carboxyethyl, or other suitable carboxyalkyl groups, and alkylated cyclodextrin containing methyl, ethyl, propyl, benzyl, or other suitable alkyl groups. Examples of some of these cyclodextrin derivatives include, but are not limited to, methyl cyclodextrins, hydroxyethyl cyclodextrins, hydroxypropyl cyclodextrins, 2-hydroxyethyl cyclodextrins, carboxymethyl cyclodextrins, and carboxyethyl cyclodextrins. In certain embodiments, cyclodextrin may have glucose or maltose attached to the cyclodextrin ring, such as glucosyl cyclodextrins and maltosyl cyclodextrins. Specific examples of suitable cyclodextrin derivatives, include, but are not limited to, glucosyl-α-cyclodextrin, maltosyl-α-cyclodextrin, glucosyl-β-cyclodextrin, maltosyl-α-cyclodextrins, methyl-α-cyclodextrin, 2-hydroxypropyl-β-cyclodextrin, hydroxyethyl-α-cyclodextrin, and 2-hydroxypropyl-γ-cyclodextrin. Combinations of the above-described cyclodextrins may also be suitable.

Cyclodextrin compound dimer and trimmers may also be suitable for use in the inclusion complexes described herein. Cyclodextrin compound dimers generally include two cyclodextrin compounds covalently coupled or crosslinked together for cooperative complexing with the "guest" acid precursor ester. Cyclodextrin compound trimers generally include three cyclodextrin compounds covalently coupled or crosslinked together for cooperative complexing with the "guest" acid precursor ester. In other embodiments, greater than three, and even 10 or more, cyclodextrin compounds covalently coupled or crosslinked together for cooperative complexing with the "guest" acid precursor ester.

The acid precursor ester for use in the inclusion complexes described herein may include any ester capable of hydrolyzing to form an acid capable of removing (e.g., dissolving, dissipating, and the like) a portion of a filtercake in a subterranean formation. They may be partially, substantially, or wholly hydrophobic. Generally, the more hydrophobic the acid precursor ester, the greater the delay in the hydrolysis of the acid precursor ester due to interaction with the cyclodextrin compound, as described herein, which may be preferred such as for use in particularly high temperature formations. Examples of specific acid precursors for use in forming the inclusion complexes may include, but are not limited to, a formate ester, a lactate ester, a citrate ester, a carboxylate ester, an acetate ester, a propionate ester, a propanoate ester, a butanoate ester, a methanoate ester, an ethanoate ester, a butyrate ester, a cyclic ester, an orthoester, a butyl acetate ester, a gamma-valerolactone ester, a triethylorthoformate ester, a triphynol phosphate ester, a phosphoric acid ester, an acrylate ester, an isoamyl acetate ester, an ethyl acetate ester, a methyl salicylate ester, an ethyl butyrate ester, a benzyl butyrate ester, an ethyl propionate ester, an ethyl benzoate ester, a benzyl acetate ester, a methyl butyrate ester, an octyl acetate ester, a n-propyl acetate ester, an ethyl phenylacetate ester, an ethyl ethanoate ester, and any combination thereof. In some preferred embodiments, the acid precursor ester is a formate ester, lactate ester, or a combination thereof.

In some embodiments, the molar ratio of the acid precursor ester to the cyclodextrin compound for use in forming the inclusion complexes described herein may be in the amount in the range of from a lower limit of about 1:1, 2:1, 3:1, 4:1, 5:1, 6:1, 7:1, 8:1, 9:1, and 10:1 to an upper limit of about 20:1, 19:1, 18:1, 17:1, 16:1, 15:1, 14:1, 13:1, 12:1, 11:1, and 10:1, encompassing any value and subset therebetween.

Suitable base fluids for forming the treatment fluids described herein may include any treatment fluid suitable for use in a subterranean formation. Suitable base fluids include, but are not limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, potassium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

The treatment fluids may, in some embodiments, further comprise an additive designed to aid in completion of a particular subterranean formation treatment operation. Suitable additives that may be included in the treatment fluids of the present disclosure may include, but are not limited to, silica scale control additives, surfactants, gel stabilizers, antioxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, biocides, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

In various embodiments, systems configured for delivering the treatment fluids comprising the inclusion complexes described herein to a downhole location are described. In various embodiments, the systems can comprise a pump fluidly coupled to a tubular, the tubular containing the treatment fluids described herein. It will be appreciated that while the system described below may be used for delivering either or both of the temporary sealant slurry and the fracturing fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 2:
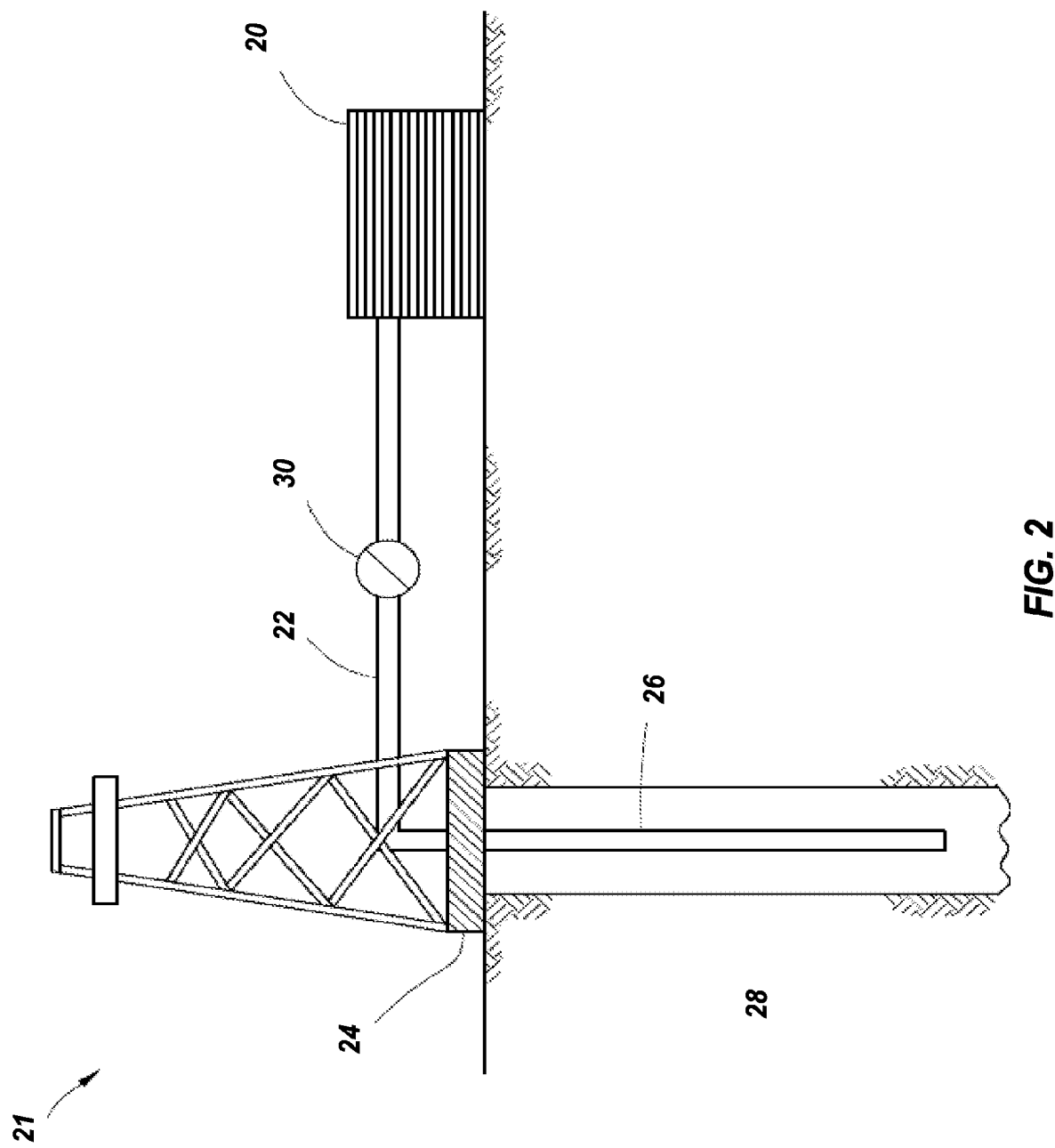
FIG. 2 shows an illustrative schematic of a system for delivering fluids described herein to a downhole location, according to one or more embodiments.

FIG. 2 shows an illustrative schematic of a system that can deliver the treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 21 may include mixing tank 20, in which the treatment fluids of the embodiments herein may be formulated. The treatment fluids may be conveyed via line 22 to wellhead 24, where the treatment fluids enter tubular 26, tubular 26 extending from wellhead 24 into subterranean formation 28. Upon being ejected from tubular 26, the treatment fluids may subsequently penetrate into subterranean formation 28. Pump 30 may be configured to raise the pressure of the treatment fluids to a desired degree before introduction into tubular 26. It is to be recognized that system 21 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 24 and exit subterranean formation 28. In some embodiments, the treatment fluid that has flowed back to wellhead 24 may subsequently be recovered and recirculated to subterranean formation 28.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

EMBODIMENTS DISCLOSED HEREIN INCLUDE

Embodiment A: A method comprising: introducing a treatment fluid into a subterranean formation having an filtercake deposited thereon, wherein the treatment fluid comprises a base fluid and an inclusion complex comprising a cyclodextrin compound and an acid precursor ester, and wherein the cyclodextrin compound delays hydrolysis of the acid precursor ester; contacting the treatment fluid with the filtercake; and hydrolyzing the acid precursor ester, thereby removing at least a portion of the filtercake.

Embodiment A may have one or more of the following additional elements in any combination:

Element A1: Wherein the cyclodextrin compound is at least one of a cyclodextrin compound dimer and a cyclodextrin compound trimer.

Element A2: Wherein the cyclodextrin compound is selected from the group consisting of α-cyclodextrin, β-cyclodextrin, γ-cyclodextrin, and any combination thereof.

Element A3: Wherein the cyclodextrin compound is a cyclodextrin derivative selected from the group consisting of an acylated cyclodextrin, a hydroxylated cyclodextrin, a carboxylated cyclodextrin, an alkylated cyclodextrin, a methyl cyclodextrin, a hydroxyethyl cyclodextrin, a hydroxypropyl cyclodextrin, a 2-hydroxyethyl cyclodextrin, a carboxymethyl cyclodextrin, a carboxyethyl cyclodextrin, a glucosyl cyclodextrin, a maltosyl cyclodextrin, and any combination thereof.

Element A4: Wherein the cyclodextrin compound is a cyclodextrin derivative selected from the group consisting of a hydroxypropyl-β-cyclodextrin, a glucosyl-α-cyclodextrin, a maltosyl-α-cyclodextrin, a glucosyl-γ-cyclodextrin, a methyl-α-cyclodextrin, a hydroxyethyl-α-cyclodextrin, and 2-hydroxypropyl-γ-cyclodextrin, and any combination thereof.

Element A5: Wherein the acid precursor ester is selected from the group consisting of a formate ester, a lactate ester, a citrate ester, a carboxylate ester, an acetate ester, a propionate ester, a propanoate ester, a butanoate ester, a methanoate ester, an ethanoate ester, a butyrate ester, a cyclic ester, an orthoester, a butyl acetate ester, a gamma-valerolactone ester, a triethylorthoformate ester, a triphynol phosphate ester, a phosphoric acid ester, an acrylate ester, an isoamyl acetate ester, an ethyl acetate ester, a methyl salicylate ester, an ethyl butyrate ester, a benzyl butyrate ester, an ethyl propionate ester, an ethyl benzoate ester, a benzyl acetate ester, a methyl butyrate ester, an octyl acetate ester, a n-propyl acetate ester, an ethyl phenylacetate ester, an ethyl ethanoate ester, and any combination thereof.

Element A6: Wherein the molar ratio of the acid precursor ester to the cyclodextrin compound in the inclusion complex in a ratio of about 1:1 to about 20:1.

Element A7: Wherein the filtercake is formed substantially of a particulate bridging material comprising an inorganic salt.

Element A8: Wherein the filtercake is formed substantially of a particulate bridging material comprising an inorganic salt selected from the group consisting of calcium carbonate, manganese (II,II) oxide, zinc oxide, magnesium carbonate, and any combination thereof.

Element A9: Wherein the filtercake is located on at least one of a face of the subterranean formation and a face of a fracture in the subterranean formation.

Element A10: Wherein the subterranean formation has a temperature in the range of about 25° C. to about 150° C.

Element A11: Wherein the treatment fluid is introduced into the subterranean formation as a pill.

By way of non-limiting example, exemplary combinations applicable to A include: A with A1 and A2; A with A4, A5, and A7; A with A3, and A8; A with A9, A10, and A11; A with A1 and A11; A with A7 and A9; A with A5, A6, and A8.

Embodiment B: A treatment fluid comprising: a base fluid; and an inclusion complex comprising a cyclodextrin compound and an acid precursor ester, wherein the cyclodextrin compound delays hydrolysis of the acid precursor ester.

Embodiment B may have one or more of the following additional elements in any combination:

Element B1: Wherein the cyclodextrin compound is at least one of a cyclodextrin compound dimer and a cyclodextrin compound trimer.

Element B2: Wherein the cyclodextrin compound is selected from the group consisting of α-cyclodextrin, β-cyclodextrin, γ-cyclodextrin, and any combination thereof.

Element B3: Wherein the cyclodextrin compound is a cyclodextrin derivative selected from the group consisting of an acylated cyclodextrin, a hydroxylated cyclodextrin, a carboxylated cyclodextrin, an alkylated cyclodextrin, a methyl cyclodextrin, a hydroxyethyl cyclodextrin, a hydroxypropyl cyclodextrin, a 2-hydroxyethyl cyclodextrin, a carboxymethyl cyclodextrin, a carboxyethyl cyclodextrin, a glucosyl cyclodextrin, a maltosyl cyclodextrin, and any combination thereof.

Element B4: Wherein the cyclodextrin compound is a cyclodextrin derivative selected from the group consisting of a hydroxypropyl-β-cyclodextrin, a glucosyl-α-cyclodextrin, a maltosyl-α-cyclodextrin, a glucosyl-β-cyclodextrin, a methyl-α-cyclodextrin, a hydroxyethyl-α-cyclodextrin, and 2-hydroxypropyl-γ-cyclodextrin, and any combination thereof.

Element B5: Wherein the acid precursor ester is selected from the group consisting of a formate ester, a lactate ester, a citrate ester, a carboxylate ester, an acetate ester, a propionate ester, a propanoate ester, a butanoate ester, a methanoate ester, an ethanoate ester, a butyrate ester, a cyclic ester, an orthoester, a butyl acetate ester, a gamma-valerolactone ester, a triethylorthoformate ester, a triphynol phosphate ester, a phosphoric acid ester, an acrylate ester, an isoamyl acetate ester, an ethyl acetate ester, a methyl salicylate ester, an ethyl butyrate ester, a benzyl butyrate ester, an ethyl propionate ester, an ethyl benzoate ester, a benzyl acetate ester, a methyl butyrate ester, an octyl acetate ester, a n-propyl acetate ester, an ethyl phenylacetate ester, an ethyl ethanoate ester, and any combination thereof.

Element B6: Wherein the molar ratio of the acid precursor ester to the cyclodextrin compound in the inclusion complex in a ratio of about 1:1 to about 20:1.

By way of non-limiting example, exemplary combinations applicable to B include: B with B2 and B6; B with B5 and B6; B with B1, B3, and B4; B with B1 and B2; B with B3 and B4.

Element C: A system comprising: a wellhead with a tubular extending therefrom and into a subterranean formation; and a pump fluidly coupled to the tubular, the tubular comprising a treatment fluid comprising a base fluid and an inclusion complex, the inclusion complex comprising a cyclodextrin compound and an acid precursor ester, and wherein the cyclodextrin compound delays hydrolysis of the acid precursor ester.

Element C may have one or more of the following additional elements in any combination:

Element C1: Wherein the cyclodextrin compound is at least one of a cyclodextrin compound dimer and a cyclodextrin compound trimer.

Element C2: Wherein the cyclodextrin compound is selected from the group consisting of α-cyclodextrin, β-cyclodextrin, γ-cyclodextrin, and any combination thereof.

Element C3: Wherein the cyclodextrin compound is a cyclodextrin derivative selected from the group consisting of an acylated cyclodextrin, a hydroxylated cyclodextrin, a carboxylated cyclodextrin, an alkylated cyclodextrin, a methyl cyclodextrin, a hydroxyethyl cyclodextrin, a hydroxypropyl cyclodextrin, a 2-hydroxyethyl cyclodextrin, a carboxymethyl cyclodextrin, a carboxyethyl cyclodextrin, a glucosyl cyclodextrin, a maltosyl cyclodextrin, and any combination thereof.

Element C4: Wherein the cyclodextrin compound is a cyclodextrin derivative selected from the group consisting of a hydroxypropyl-β-cyclodextrin, a glucosyl-α-cyclodextrin, a maltosyl-α-cyclodextrin, a glucosyl-β-cyclodextrin, a methyl-α-cyclodextrin, a hydroxyethyl-α-cyclodextrin, and 2-hydroxypropyl-γ-cyclodextrin, and any combination thereof.

Element C5: Wherein the acid precursor ester is selected from the group consisting of a formate ester, a lactate ester, a citrate ester, a carboxylate ester, an acetate ester, a propionate ester, a propanoate ester, a butanoate ester, a methanoate ester, an ethanoate ester, a butyrate ester, a cyclic ester, an orthoester, a butyl acetate ester, a gamma-valerolactone ester, a triethylorthoformate ester, a triphynol phosphate ester, a phosphoric acid ester, an acrylate ester, an isoamyl acetate ester, an ethyl acetate ester, a methyl salicylate ester, an ethyl butyrate ester, a benzyl butyrate ester, an ethyl propionate ester, an ethyl benzoate ester, a benzyl acetate ester, a methyl butyrate ester, an octyl acetate ester, a n-propyl acetate ester, an ethyl phenylacetate ester, an ethyl ethanoate ester, and any combination thereof.

Element C6: Wherein the molar ratio of the acid precursor ester to the cyclodextrin compound in the inclusion complex in a ratio of about 1:1 to about 20:1.

Element C7: Wherein the subterranean formation has a temperature in the range of about 25° C. to about 150° C.

Element C8: Wherein the treatment fluid is introduced into the subterranean formation as a pill.

By way of non-limiting example, exemplary combinations applicable to C include: C with C1, C7, and C8; C with C2 and C6; C with C4, C5, and C8; C with C1 and C3.

To facilitate a better understanding of the embodiments of the present invention, the following examples of preferred or representative embodiments are given. In no way should the following examples be read to limit, or to define, the scope of the invention.

EXAMPLE 1

In this example, the ability of the inclusion complexes to delay hydrolysis of an acid precursor ester was evaluated. An inclusion complex was prepared by first dissolving 10.72 g (1:1 molar ratio of acid precursor ester:cyclodextrin derivative) of the cyclodextrin derivative 2-hydroxypropyl-β-cyclodextrin in water. To the dissolved cyclodextrin derivative, 1 mL (6.25% v/v) of a formate acid precursor ester was added. The mixture was stirred slowly for 2-3 hours at room temperature ("RT") (about 20° C. to about 25° C.) to form the inclusion complex, referred to as "Test Solution A." A "Control Solution A" was also prepared using the 1 mL (6.25% v/v) of the formate acid precursor ester in water.

Test Solution A and the Control Solution A were next heated in a water bath to 90° C. to simulate elevated temperatures in a subterranean formation, and their pH was measured as a function of time to compare hydrolysis rates of the formate acid precursor ester forming part of the inclusion complex (Test Solution A) and the formate acid precursor ester alone (Control Solution A). The results are presented in Table 1.

TABLE 1

| Time (min) | Temp. (° C.) | TEST SOLUTION A pH | CONTROL SOLUTION A pH |
|---|---|---|---|
| 0 | 25 (RT) | 6.12 | 5.30 |
| 10 | 90 | 4.31 | 2.76 |
| 20 | 90 | 4.30 | 2.31 |
| 30 | 90 | 3.60 | 1.84 |
| 40 | 90 | 3.50 | 1.57 |
| 50 | 90 | 3.20 | 1.50 |

TABLE 1-continued

| Time (min) | Temp. (° C.) | TEST SOLUTION A pH | CONTROL SOLUTION A pH |
|---|---|---|---|
| 60 | 90 | 2.50 | 1.47 |
| 70 | 90 | 2.18 | 1.36 |
| 80 | 90 | 1.96 | 1.23 |
| 90 | 90 | 1.84 | 1.27 |
| 100 | 90 | 1.66 | 1.26 |
| 120 | 90 | 1.64 | 1.30 |
| 140 | 90 | 1.55 | 1.15 |
| 160 | 90 | 1.50 | 1.14 |

As shown in Table 1, at 90° C., the Control Solution A exhibited a significantly higher pH than the Test Solution A, indicating that the inclusion complex is capable of delaying the hydrolysis of the formate acid precursor ester at elevated temperatures. For example, Test Solution A reached pH 1.84 after 90 min, whereas the Control Solution A reached pH 1.84 after only 30 min, a time difference of 60 min. Test Solution A reached pH ~1.57 after 140 min, whereas the Control Solution A reached pH 1.57 after only 40 min, a time difference of 100 min. Test Solution A reached pH 1.50 after 160 min, whereas the Control Solution A reached pH 1.50 after only 50 min, a time difference of 110 min. Accordingly, the inclusion complex is capable of delaying the hydrolysis of an acid precursor ester even up to 110 min. Moreover, the general drop in pH is considerably slower in Test Solution A than in the Control Solution A, indicating that the inclusion complex delays hydrolysis of the acid precursor ester at all times.

EXAMPLE 2

In this example, the effect of the inclusion complex to remove a filtercake comprising calcium carbonate ($CaCO_3$) particulate bridging materials was evaluated. The Treatment Solution A and Control Solution A were prepared according to Example 1, and preheated to 90° C. for approximately 10 minutes. Next, 10 minutes after reaching temperature, 0.50 g of $CaCO_3$ (or about 3% of the liquid mixture), an amount in which complete dissolution after reacting with the acid precursor ester was expected, was added and the solutions were left in the 90° C. water bath for 2.5 hours. Any hydrolysis was thereafter quenched by immersing the solution vials in ice water. The Treatment Solution A and Control Solution A were kept at RT overnight and afterward filtered to measure the dissolved and undissolved $CaCO_3$. The results are shown in Table 2.

TABLE 2

| | Dissolved $CaCO^3$ | Remaining $CaCO^3$ |
|---|---|---|
| Test Solution A | 34% | 66% |
| Control Solution A | 72% | 28% |

The Control Solution A dissolved 72% of the $CaCO_3$ after the elapsed 2.5 hours, whereas Test Solution A only dissolved 34% of the $CaCO_3$, clearly demonstrating a 38% dissolution delay using the inclusion complex described in the embodiments herein. The higher dissolution of $CaCO_3$ observed in the Control Solution A was also apparent upon visual inspection after only 2.5 hours, where the Test Solution A had considerably more $CaCO_3$ clumping/layering.

EXAMPLE 3

In this example, the effect of the inclusion complex to completely dissolve $CaCO_3$ particulate bridging materials was evaluated. The Test Solution A and Control Solution A were prepared according to Example 1, and preheated to 90° C. for approximately 10 minutes. Next, 0.50 g of CaCO₃ was added and each of the solutions was left in the 90° C. water bath until the mixture appeared homogeneous, as evidenced by a lack of visible CaCO₃ clumping or particulate matter in the solutions. The results of the time for complete dissolution of CaCO₃ dissolved are shown in Table 3.

TABLE 3

| | Time for Complete Dissolution |
|---|---|
| Test Solution A | 7.5 hrs |
| Control Solution A | 3.5 hrs |

The results indicate that the Control Solution A comprising only the formate acid precursor ester without the inclusion complex was visually homogeneous after 3.5 hours, whereas the Test Solution A having the inclusion complex was not visually homogeneous until after 7.5 hours, demonstrating a clear dissolution delay of 4 hours.

EXAMPLE 4

In this example, the effect of the inclusion complex to remove a filtercake comprising CaCO₃ particulate bridging materials was evaluated. An inclusion complex was prepared by first dissolving 25 g (12.7:1 molar ratio of acid precursor ester:cyclodextrin derivative) of the cyclodextrin derivative 2-hydroxypropyl-β-cyclodextrin in water. To the dissolved cyclodextrin derivative, 25 mL (11% v/v) of a lactate acid precursor ester was added. The mixture was stirred slowly for 2-3 hours at room temperature ("RT") (about 20° C. to about 25° C.) to form the inclusion complex, referred to as "Test Solution B." A "Control Solution B" was also prepared using the 25 mL (11% v/v) of the lactate acid precursor ester in water.

Two CaCO₃ filtercakes were prepared based on a mud formulation according to Table 4. After the mud formulation was mixed, it was placed in a pint jar and rolled at 65° C. for 16 hours. The mixture was then cooled to RT and mixed again for 2 minutes.

TABLE 4

| Component | Quantity |
|---|---|
| Tap water | 324 mL |
| Potassium chloride | 10.33 g |
| A crosslinked starch fluid loss control agent | 8.75 g |
| A xanthan gum polymer viscosifier | 1.00 g |
| A CaCO₃ particulate bridging material (various mesh sizes) | 40.00 g |
| An alkaline buffer (magnesium oxide) | 1.00 g |

The filtercake forumulation was then placed in a high-pressure, high-temperature ("HPHT") cell to form the filtercake on a 20 micron ceramic disc at 121° C. After the filtercake formed on the disc, any excess fluid was removed by pouring from the HPHT cell. To each filtercake, either the Test Solution B or the Control Solution B was added, and then the HPHT cell was placed in a preheated HPHT jacket at 149° C. for 3 hours to stimulate downhole temperatures in a subterranean formation. Thereafter, the heat was removed and the cells were cooled in the jacket for 4 hours. Once cooled, the cells were opened and dissolution was visually observed, then they were heated overnight at 149° C. to ensure complete dissolution.

After 4 hours at 149° C., slower dissolution was visually apparent with the Test Solution B by a greater degree of the filtercake being visibly present compared to the Control Solution B, and because the Test Solution B filtercake was less changed from its initial appearance as compared to the Control Solution B and its initial filtercake. Overall, higher and faster dissolution of the filtercake was observed with the Control Solution B as compared to the Test Solution B. Moreover, the molar ratio of the acid precursor ester to the cyclodextrin derivative in the inclusion complex can be varied to adjust the dissolution rate, and to adjust the dissolution rate based on the temperature of a particular subterranean formation.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A and B" or "at least one of A or B" each refer to only A, only B, or only C; any combination of A, B, and C; and/or at least one of each of A, B, and C.

The invention claimed is:
1. A composition comprising:
a base fluid;
an inclusion complex comprising a cyclodextrin compound and an acid precursor ester; and
a filter cake comprising a bridging agent;
wherein the inclusion complex is formed by combining the acid precursor ester and the cyclodextrin compound as a solution with stirring for at least two hours, wherein the inclusion complex delays hydrolysis of the acid precursor ester; and wherein molar ratio of the acid precursor ester to the cyclodextrin compound in the inclusion complex is a ratio of about 1:1 to about 20:1.

2. The composition of claim 1, wherein the cyclodextrin compound is at least one of a cyclodextrin compound dimer and a cyclodextrin compound trimer.

3. The composition of claim 1, wherein the cyclodextrin compound is selected from the group consisting of α-cyclodextrin, β-cyclodextrin, γ-cyclodextrin, and any combination thereof.

4. The composition of claim 1, wherein the cyclodextrin compound is selected from the group consisting of an acylated cyclodextrin, a hydroxylated cyclodextrin, a carboxylated cyclodextrin, an alkylated cyclodextrin, a methyl cyclodextrin, a hydroxyethyl cyclodextrin, a 2-hydroxyethyl cyclodextrin, a carboxymethyl cyclodextrin, a carboxyethyl cyclodextrin, a glucosyl cyclodextrin, a maltosyl cyclodextrin, and any combination thereof.

5. The composition of claim 1, wherein the cyclodextrin compound is selected from the group consisting of a glucosyl-α-cyclodextrin, a maltosyl-α-cyclodextrin, a glucosyl-β-cyclodextrin, a methyl-α-cyclodextrin, a hydroxyethyl-α-cyclodextrin, and 2-hydroxypropyl-γ-cyclodextrin, and any combination thereof.

6. The composition of claim 1, wherein the acid precursor ester is selected from the group consisting of a formate ester, a lactate ester, a citrate ester, a carboxylate ester, an acetate ester, a propionate ester, a propanoate ester, a butanoate ester, a methanoate ester, an ethanoate ester, a butyrate ester, a cyclic ester, an orthoester, a butyl acetate ester, a gamma-valerolactone ester, a triethylorthoformate ester, a triphynol phosphate ester, a phosphoric acid ester, an acrylate ester, an isoamyl acetate ester, an ethyl acetate ester, a methyl salicylate ester, an ethyl butyrate ester, a benzyl butyrate ester, an ethyl propionate ester, a benzyl acetate ester, a methyl butyrate ester, an octyl acetate ester, a n-propyl acetate ester, an ethyl phenylacetate ester, an ethyl ethanoate ester, and any combination thereof.

7. The composition of claim 1, further comprising silica scale control additives, surfactants, gel stabilizers, antioxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers, gelling agents, lubricants, breakers, friction reducers, bridging agents, viscosifiers, weighting agents, solubilizers, pH control agents, hydrate inhibitors, consolidating agents, biocides, clay stabilizers, breakers, delayed release breakers, or any combination thereof.

8. The composition of claim 1, wherein the bridging agent is selected from the group consisting of calcium carbonate, manganese oxide, zinc oxide, magnesium carbonate, and combinations thereof.

* * * * *